(12) United States Patent
Dunne et al.

(10) Patent No.: US 12,010,459 B1
(45) Date of Patent: Jun. 11, 2024

(54) SEPARATE REPRESENTATIONS OF VIDEOCONFERENCE PARTICIPANTS THAT USE A SHARED DEVICE

(71) Applicant: Amazon Technologies, Inc., Seattle, WA (US)

(72) Inventors: John Joseph Dunne, Bremerton, WA (US); Michael Klingbeil, North Haven, CT (US); Michael Mark Goodwin, Scotts Valley, CA (US); Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,731

(22) Filed: Mar. 31, 2022

(51) Int. Cl.
*H04N 7/15* (2006.01)
*G06V 40/16* (2022.01)
*G10L 17/06* (2013.01)

(52) U.S. Cl.
CPC ............ *H04N 7/15* (2013.01); *G06V 40/172* (2022.01); *G10L 17/06* (2013.01)

(58) Field of Classification Search
CPC .......... H04N 7/15; H04N 7/147; G10L 17/06; G06V 40/16
USPC ............................................ 348/14.01–14.16
See application file for complete search history.

(56) References Cited

U.S. PATENT DOCUMENTS

| | | |
|---|---|---|
| 9,706,136 B2 | 7/2017 | Lee et al. |
| 11,356,488 B2 * | 6/2022 | Mackell ............... H04L 65/1083 |
| 2014/0074467 A1 | 3/2014 | Ziv et al. |
| 2019/0215464 A1 * | 7/2019 | Kumar ...................... H04N 7/08 |
| 2021/0026517 A1 * | 1/2021 | Yang ...................... G06V 40/164 |
| 2022/0237735 A1 * | 7/2022 | Zingade ................. G06V 20/40 |

(Continued)

FOREIGN PATENT DOCUMENTS

| | | | | |
|---|---|---|---|---|
| WO | WO-2011022194 A2 * | 2/2011 | ............. | G06F 9/543 |
| WO | WO-2016025951 A1 * | 2/2016 | ......... | H04L 12/1822 |

OTHER PUBLICATIONS

Paturi et al.; "Directed Speech Separation for Automatic Speech Recognition of Long Form Conversational Speech"; Interspeech; 2022; 5 pages.

(Continued)

*Primary Examiner* — Duc Nguyen
*Assistant Examiner* — Assad Mohammed
(74) *Attorney, Agent, or Firm* — BakerHostetler

(57) ABSTRACT

A plurality of device-sharing participants may be detected that are participating in a videoconference via a shared computing device. The detecting of the plurality of device-sharing participants may be performed based, at least in part, on at least one of an audio analysis of captured audio from one or more microphones or a video analysis of captured video from one or more cameras. A plurality of participant connections corresponding to the plurality of device-sharing participants may be joined to the videoconference. Each of the plurality of participant connections may be identified within the videoconference using a respective name. A plurality of video streams and a plurality of audio streams corresponding to the plurality of participant connections may be transmitted, and the plurality of video streams and the plurality of audio streams may be presented to at least one other conference participant.

20 Claims, 8 Drawing Sheets

(56) References Cited

U.S. PATENT DOCUMENTS

2023/0231971 A1* 7/2023 Davidson ............... G01S 15/06
348/14.08

OTHER PUBLICATIONS

Denisov et al.; "End-to-End Multi-Speaker Speech Recognition using Speaker Embeddings and Transfer Learning"; Interspeech; arXiv:1908.04737; 2019; 5 pages.

Giri et al.; "Personalized PercepNet: Real-time, Low-complexity Target Voice Separation and Enhancement"; Interspeech 2021; arXiv:2106.04129; Jun. 2021; 5 pages.

Paturi et al.; "Directed Speech Separation For Automatic Speech Recognition of Long Form Conversational Speech"; arXiv:2112.05863; Dec. 10, 2021; 5 pages.

* cited by examiner

SEPARATE REPRESENTATIONS OF VIDEOCONFERENCE PARTICIPANTS THAT USE A SHARED DEVICE

BACKGROUND

Videoconferencing has become an increasingly common technique for conference participants at remote locations to view, speak to, and interact with, one another. In some examples, a plurality of participants may participate in a videoconference via a shared computing device. For example, in some cases, a group of participants may be huddled around a personal device, such as a laptop. In other examples, a group of users in a room may participate in a videoconference via a room conferencing device. However, in many existing conferencing scenarios, there may be a one-to-one correspondence between devices and identified meeting participants. Thus, a group of participants that share a single conferencing device may often be identified, within a videoconference, by a single name, such as a name associated with an owner, or location, of the shared device. This may be problematic for a number of reasons. For example, device-sharing participants may feel a lack of equity to other conference participants that are identified individually by name within the videoconference. Additionally, device-sharing participants may present security concerns, such as because the identity and/or quantity of the device-sharing participants may be uncertain. Furthermore, device-sharing participants may degrade the user experience, for example because all of the device-sharing participants may not be easily viewable in the conference video, such as when they are not centered in the conference video.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
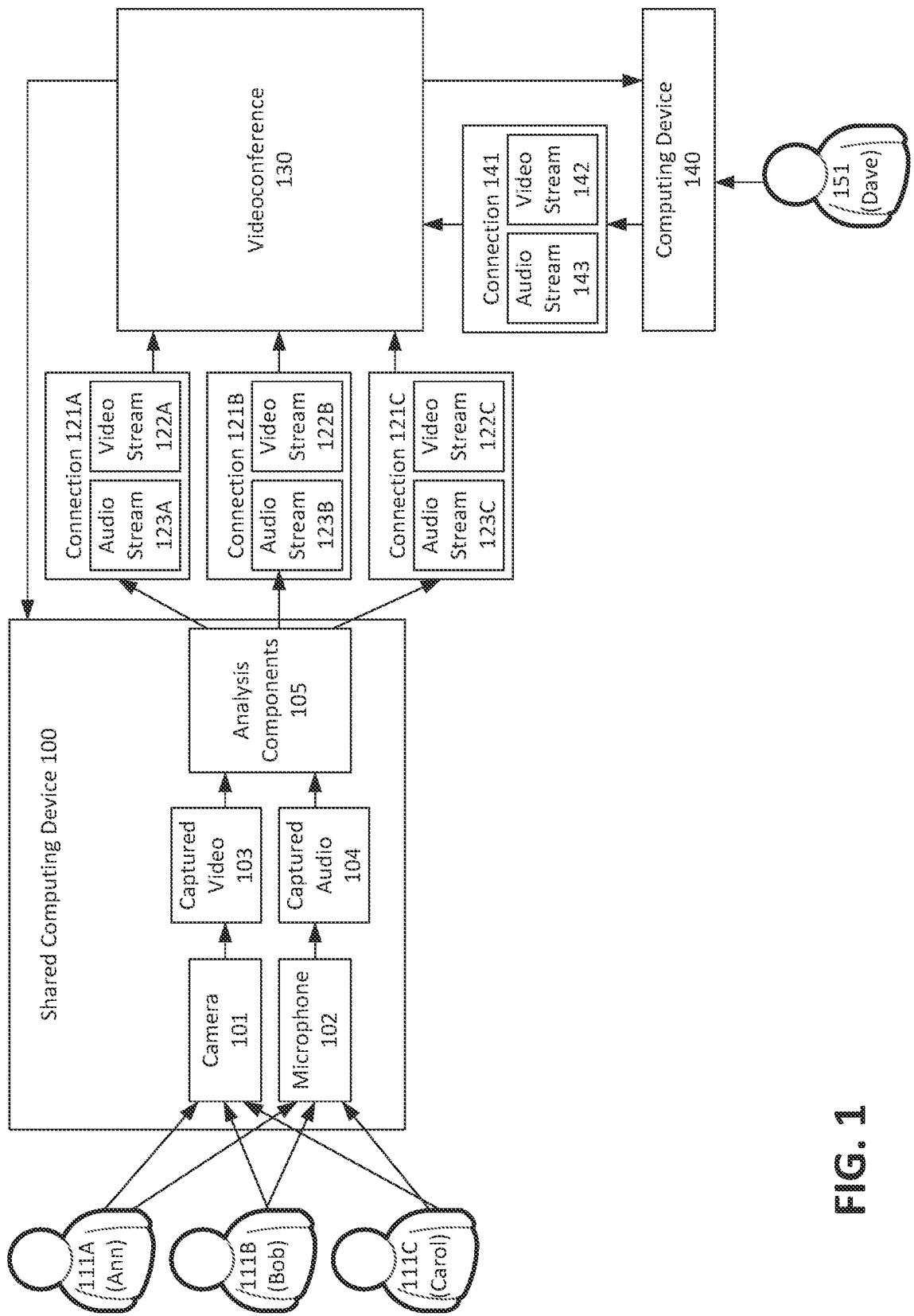
FIG. 1 is a diagram illustrating an example participant representation system with local device-based analysis that may be used in accordance with the present disclosure.

Techniques for separate representations of videoconference participants that use a shared device are described herein. A videoconference, as that term is used herein, refers to a conference including both video and audio contents that are transmitted, and received, via computing devices. In some examples, a videoconference may have a plurality of participants that participate in the videoconference via a shared computing device. These participants are referred to hereinafter as device-sharing participants. The videoconference may also have any number of other participants that connect to the videoconference via any number of other devices. The device-sharing participants may be at the same, or similar, location as one another, such as within the same room, or otherwise grouped around the shared device. For example, in some cases, the device-sharing participants may be huddled around a personal device, such as a laptop. Also, in some examples, the device-sharing participants may be in a room and may participate in a videoconference via a room conferencing device. The shared computing device (e.g., room conferencing device, laptop, smartphone, or other computing device) may have one or more connected cameras that capture video of the device-sharing participants and one or more connected microphones that capture audio of the device-sharing participants. The connected cameras and connected microphones may be included in the shared computing device itself and/or may be external components that are otherwise connected to the shared computing device.

Analysis components may be provided that may analyze the captured video content from the connected cameras and/or the captured audio content from the connected microphones to detect that there are a plurality of participants that are participating in the videoconference via the shared computing device. A variety of audio and/or video analysis techniques may be employed to detect the plurality of device-sharing participants. For example, in some cases, a facial detection and/or facial recognition analysis may be performed on the captured video to detect and/or recognize faces of people in the captured video. In some examples, each detected and/or recognized face may be determined to be one of the device-sharing participants. As another example, the captured audio content may be analyzed to detect the plurality of device-sharing participants. In one specific example, each device-sharing participant may identify himself or herself via a designated spoken phrase, such as the words "hello I am" followed by the participant's name. These spoken words may then be detected via a speech recognition analysis on the captured audio.

As another specific example, the captured audio content may be analyzed to determine unique speakers, such as via voiceprinting techniques, which may also sometimes be referred to as voice fingerprinting techniques. For example, when a first person speaks, the audio may be analyzed to determine a first voiceprint that indicates first audio characteristics of the speech of the first person. When a second person speaks, the audio content may be analyzed, and it may be determined that the second person's speech does not match the first voiceprint of the first person. A second voiceprint may then be generated that indicates second audio characteristics of the speech of the second person. Each new detected speaker that does not match an already generated voiceprint may be determined to be one of the device-sharing participants. Furthermore, in some examples, motion detection, such as lip movement detection, may be employed, such as to assist in matching detected voices in the captured audio to detected faces in the captured video. In some examples, these and other techniques may be performed based, at least in part, on one or more machine learning models, such as one or more neural networks.

Upon detecting the plurality of device-sharing participants, a plurality of connections, corresponding to the plurality device-sharing participants, may be joined to the videoconference. For example, a respective connection may be joined to the videoconference for each of the device-sharing participants. In some examples, if N is the quantity of device-sharing participants that are sharing the same shared computing device, then the videoconference may be joined N times, once for each of the device-sharing participants. For example, in some cases, if it is determined that three device-sharing participants are sharing the same shared computing device, then three separate connections, corresponding to the three device-sharing participants, may be joined to the videoconference. Additionally, each of the plurality of connections may be identified within the videoconference using a respective name, such as via list of identified participants that is displayed within the videoconference. In some examples, each detected device-sharing participant may be prompted to provide his or her name (e.g., by speaking his or her name at a designated time, after a designated phrase, etc.), or the name may be otherwise determined or detected, and this name may then be assigned to the respective connection. A respective video stream and audio stream may be provided for each of the connections. The video streams and audio streams for the plurality of connections may be output, as part of the videoconference, to the conference participants. For example, during the videoconference, the video stream for each of the connections may show the video of the respective device-sharing participant. In some examples, if the captured video from a connected camera shows faces of several of the device-sharing participants, then a plurality of outgoing video streams may be formed based on the captured video with each outgoing video stream including a respective cropped portion of the captured video that shows a face of a respective one of the device-sharing participants. In some other examples, multiple cameras may be used, for example with each camera capturing video of a given one, or a given subgroup, of the device-sharing participants.

During the videoconference, the captured audio and/or video of the device-sharing participants may be analyzed to determine when one of the device-sharing participants is an active talker. An active talker, as that term is user herein, refers to a person that is currently speaking. A variety of audio and/or video analysis techniques may be employed to detect when one of the device-sharing participants is an active talker. For example, in some cases, the voiceprinting techniques described above may be employed, such as to detect when the voice characteristics of an active talker match one of the generated voiceprints for the device-sharing participants. Other techniques, such as lip movement detection, facial detection, facial recognition, a microphone audio directionality analysis, and others, may also be employed. In some examples, one or more video and/or audio processing operations may be performed when it is detected that one of the device-sharing participants is an active talker. For example, in some cases, a visual indication of the active talker may be provided within the videoconference display, such as a highlighting of the video stream of the active talker. As another example, in some cases, audio may be temporarily routed to the videoconference on behalf of the respective audio stream for that device-sharing participant during the time that he, or she, is the active talker.

Thus, the techniques described herein may provide a number of advantages. For example, by separately identifying device-sharing participants within a videoconference, as well as providing respective audio and video streams, the device-sharing participants may feel a greater sense of equity to other conference participants that individually connect via respective devices. As another example, by separately identifying device-sharing participants within a videoconference, as well as providing respective audio and video streams, the described techniques may improve security, such as by enabling device-sharing participants to be more easily identified and quantified. As yet another example, the techniques described herein may improve the user experience. For example, by generating separate video streams that may be cropped, or otherwise configured, to show respective device-sharing participants, the described techniques may allow device-sharing participants to be more effectively viewed by other conference participants, such as in comparison to some prior scenarios in which one or more device-sharing participants may be at edges of the captured video.

FIG. 1 is a diagram illustrating an example participant representation system with local device-based analysis that may be used in accordance with the present disclosure. In the example of FIG. 1, a participant 151 participates in videoconference 130 via computing device 140. Participant 151 is named Dave. Additionally, device-sharing participants 111A-C also participate in the videoconference 130 via a shared computing device 100. Specifically, device-sharing participant 111A is named Ann, device-sharing participant 111B is named Bob, and device-sharing participant 111C is named Carol. It is noted that, while the example of FIG. 1 depicts three device-sharing participants 111A-C, the techniques described herein may be employed for any number of participants that may share a given computing device. The shared computing device 100 may be for example, a room conferencing device, a laptop, smartphone, or another computing device. The device-sharing participants 111A-C may be at the same, or similar, location as one another, such as within the same room, or otherwise grouped around the shared computing device 100. For example, in some cases, the shared computing device 100 may be a personal device, such as a laptop, and the device-sharing participants 111A-C may be huddled around the personal device. Also, in some examples, the shared computing device 100 may be a room conferencing device, and the device-sharing participants 111A-C may participate in the videoconference 130 via the room conferencing device.

In the example of FIG. 1, the shared computing device 100 includes a camera 101 that captures captured video 103 of the device-sharing participants 111A-C. The shared computing device 100 also includes a microphone 102 that captures captured audio 104 of the device-sharing participants 111A-C. In some other examples, the camera 101 and/or microphone 102 may be external to shared computing device 100 and may be connected to the shared computing device 100. Additionally, in some examples, a plurality of cameras, including camera 101, may be used to capture the captured video 103. The plurality of cameras may be included in shared computing device 100 or may be otherwise connected to shared computing device 100. Furthermore, in some examples, a plurality of microphones, including microphone 102, may be used to capture the captured audio 104. The plurality of microphones may be included in shared computing device 100 or may be otherwise connected to shared computing device 100.

Figure 2:
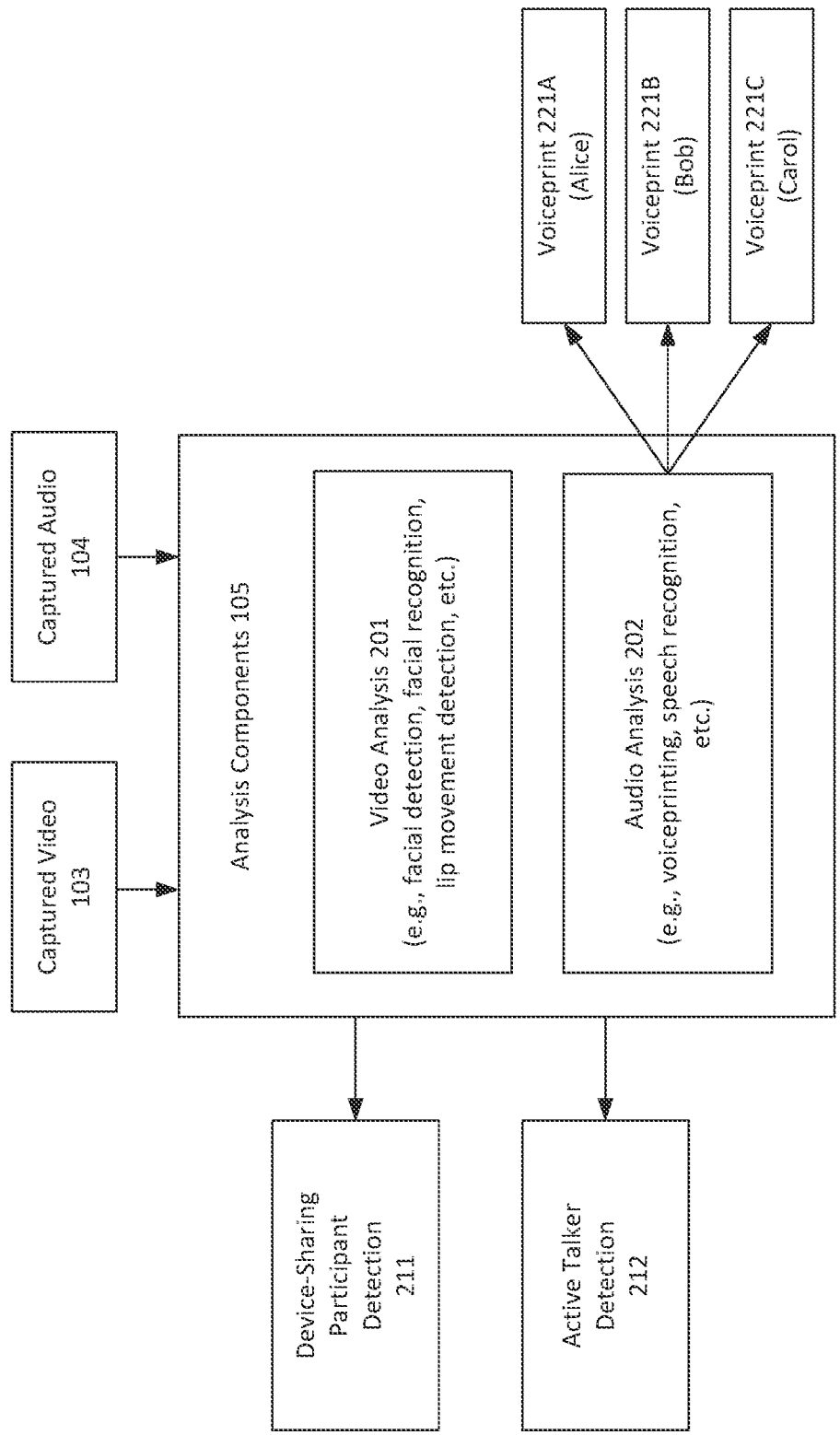
FIG. 2 is a diagram illustrating example captured audio and captured video analysis that may be used in accordance with the present disclosure.

In this example, the shared computing device 100 also includes analysis components 105, which may analyze the captured video 103 and/or the captured audio 104 to detect that the plurality of device-sharing participants 111A-C are participating in the videoconference via the shared computing device 100. A variety of techniques may be employed to detect the device-sharing participants 111A-C. Referring now to FIG. 2, some examples of operations that may be performed by analysis components 105 are now described in detail. As shown in FIG. 2, the analysis components 105 may receive captured video 103 and captured audio 104. The analysis components 105 may perform a video analysis 201 on the captured video 103 and may perform an audio analysis 202 on the captured audio 104. The video analysis 201 may include techniques such as facial detection, facial recognition, lip movement detection, and others. The audio analysis 202 may include techniques such as voiceprinting, speech recognition, and others. In some examples, any, or all, of these, and other, analysis techniques may be performed based, at least in part, on one or more machine learning models, such as one or more neural networks.

As shown in FIG. 2, the analysis components 105 may employ video analysis 201 and/or audio analysis 202 to perform device-sharing participant detection 211, which detects the device-sharing participants 111A-C. In some examples, each person detected by analysis components 105, based on captured video 103 and/or captured audio 104, may be considered to be one of the device-sharing participants 111A-C. The analysis components 105 may detect the device-sharing participants 111A-C at the initiation of the videoconference 130. The analysis components 105 may also detect when one or more of the device-sharing participants 111A-C exit the videoconference 130 while it is in-progress. In some examples, one of the device-sharing participants 111A-C may exit the videoconference 130 by leaving a room, or otherwise moving away from a location of the shared computing device 100 while the videoconference 130 is in-progress. The analysis components 105 may also detect when one or more additional device-sharing participants (not shown in FIG. 1) join the videoconference 130 while it is in-progress. In some examples, an additional device-sharing participant may join the videoconference 130 by entering a room, or otherwise moving to a location of the shared computing device 100 while the videoconference 130 is in-progress. In some examples, the analysis components 105 may determine, and track, a total device-sharing participant quantity, for example including determining the total device-sharing participant quantity at the initiation of the videoconference 130 and tracking changes to the total device-sharing participant quantity while the videoconference 130 is in-progress, such as to account for people that join and exit the videoconference 130 while the videoconference 130 is in-progress.

In some examples, analysis components 105 may perform a facial detection and/or facial recognition analysis on the captured video 103 to detect and/or recognize faces of people in the captured video 103. In some examples, each detected and/or recognized face may be determined to be one of the device-sharing participants 103A-C. As another example, analysis components 105 may analyze the captured audio 104 to detect the device-sharing participants 111A-C. In one specific example, each device-sharing participant 111A-C may identify herself or himself via a designated spoken phrase, such as the words "hello I am" followed by the person's name. These spoken words may then be detected via a speech recognition analysis on the captured audio 104.

As another specific example, the captured audio 104 may be analyzed to determine unique speakers, such as via voiceprinting techniques. In the example of FIG. 2, voiceprints 221A-N are generated for device-sharing participants 111A-C. Specifically, voiceprint 221A is generated for device-sharing participant 111A (Alice), voiceprint 221B is generated for device-sharing participant 111B (Bob), and voiceprint 221C is generated for device-sharing participant 111C (Carol). Voiceprinting may also be used to detect device-sharing participants 111A-C. For example, when a first person (e.g., Ann) speaks, the captured audio 104 may be analyzed to determine a first voiceprint (e.g., voiceprint 221A) that indicates first audio characteristics of the speech of the first person (e.g., Ann). When a second person (e.g., Bob) speaks, the captured audio 104 may be analyzed, and it may be determined that the second person's speech does not match the first voiceprint (e.g., voiceprint 221A) of the first person (e.g., Ann). A second voiceprint (e.g., voiceprint 221B) may then be generated that indicates second audio characteristics of the speech of the second person (e.g., Bob). Each new detected speaker that does not match an already generated voiceprint may be determined to be one of the device-sharing participants 111A-C. Furthermore, in some examples, motion detection, such as lip movement detection, may be employed, such as to assist in matching detected voices in the captured audio 104 to detected faces in the captured video 103.

Referring back to FIG. 1, it is shown that, upon detection of the device-sharing participants 111A-C, three connections 121A-C, corresponding to the device-sharing participants 111A-C, respectively, are joined to the videoconference 130, such as by analysis components 105. In this example, each device-sharing participant 111A-C has his, or her, own respective connection 121A-N. Specifically, connection 121A corresponds to device-sharing participant 111A (Ann), connection 121B corresponds to device-sharing participant 111B (Bob), and connection 121C corresponds to device-sharing participant 111C (Carol). Each of connections 121A-C has a respective one of video streams 122A-C and a respective one of audio streams 123A-C. The video streams 122A-C and audio streams 123A-C may be output, as part of the videoconference 130, to participant 151 (Dave) and/or device-sharing participants 111A-C. For example, during the videoconference 130, the video streams 122A-C may each show video of a respective one of device-sharing participants 111A-C. In some examples, if the captured video 103 from camera 101 shows faces of all of the device-sharing participants 111A-C, then video streams 122A-C may be formed based on the captured video 103 with each of video streams 122A-C including a respective cropped portion of the captured video 103 that shows a face of a respective one of the device-sharing participants 111A-C. In some other examples, multiple cameras may be used, for example with each camera capturing video of a given one, or a given subgroup, of the device-sharing participants 111A-C.

In some examples, the quantity of connections 121A-C for the device-sharing participants 111A-C may be equal to the quantity of device-sharing participants 111A-C, for example such that the videoconference 130 is joined a respective time for each of the device-sharing participants 111A-C. Additionally, a quantity of connections 121A-C for the device-sharing participants 111A-C may be adjusted during the course of the videoconference based on leaving of device-sharing participants 111A-C and/or joining of new device-sharing participants. In some examples, when it is detected that a given one of device-sharing participants 111A-C leaves the videoconference 130 while the videoconference 130 is in-progress, a respective one of the connections 121A-C to the videoconference 130 may be terminated. For example, if it is detected that Bob leaves the videoconference 130 while the videoconference 130 is in-progress, then connection 121B to the videoconference 130 may be terminated, including termination of video stream 122B and audio stream 123B. Also, in some examples, when it is detected that a new device-sharing participant joins the videoconference 130 while the videoconference 130 is in-progress, a respective new connections to the videoconference 130 may be initiated, for example including a respective new video stream and a respective new audio stream.

As also shown in FIG. 1, a connection 141 to videoconference 130 is established, by computing device 140, on behalf of participant 151 (Dave). The connection 141 includes a video stream 142, which may include video of participant 151 (Dave), and an audio stream 143, which may include audio of participant 151 (Dave).

Figure 3:
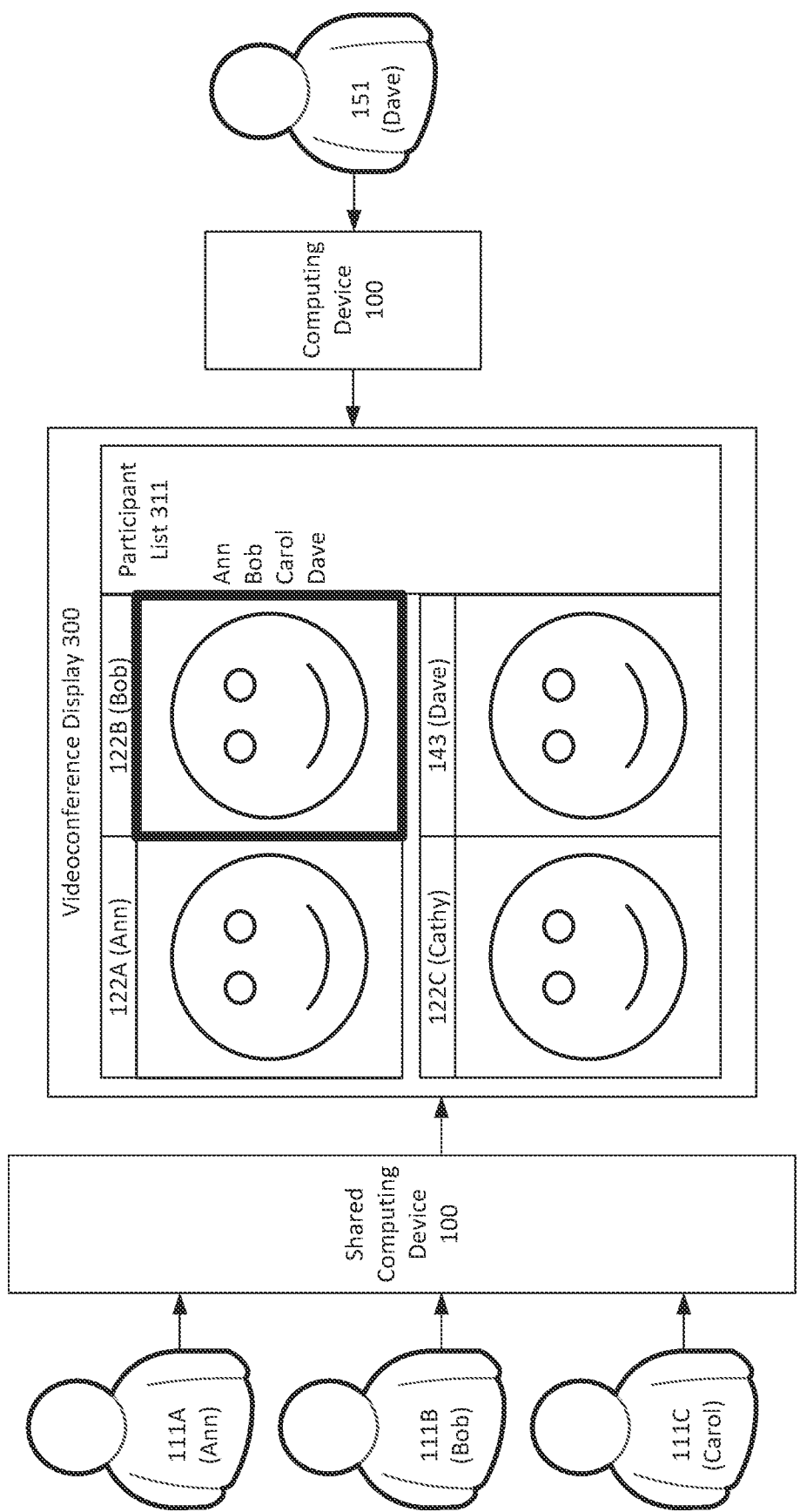
FIG. 3 is a diagram illustrating an example videoconference display with a first active talker that may be used in accordance with the present disclosure.

Referring now to FIG. 3, an example of a videoconference display 300 for videoconference 130 is shown. In some examples, videoconference display 300 may be shown to participant 151 (Dave), such as via a display of computing device 140, and/or may be shown to device-sharing participants 111A-C, such as via a display of shared computing device 100. In the example of FIG. 3, videoconference display 300 shows video stream 122A, from connection 121A, corresponding to device-sharing participant 111A (Ann); video stream 122B, from connection 121B, corresponding to device-sharing participant 111B (Bob); video stream 122C, from connection 121C, corresponding to device-sharing participant 111C (Carol); and video stream 142, from connection 141, corresponding to participant 151 (Dave). As shown in FIG. 3, video stream 122A shows video of Ann, including Ann's face, which is centered in the video stream 122A. Video stream 122B shows video of Bob, including Bob's face, which is centered in the video stream 122B. Video stream 122C shows video of Carol, including Carol's face, which is centered in the video stream 122C. Video stream 142 shows video of Dave, including Dave's face, which is centered in the video stream 142.

In this example, each of the connections 121A-C for the device-sharing participants 111A-C is identified within the videoconference 130 using a respective name. Specifically, each of the connections 121A-C is identified in a participant list 311 that is included in the videoconference display 300. In this example, each of connections 121A-C corresponds to a respective one of the device-sharing participants 111A-C. Thus, each of connections 121A-C is identified in the participant list 311 by showing the name of the respective one of the device-sharing participants 111A-C (e.g., Alice, Bob and Carol). In some examples, each of device-sharing participants 111A-C may be prompted to provide his or her name (e.g., by speaking his or her name at a designated time, after a designated phrase, etc.), or the name may be otherwise determined or detected, and this name may then be assigned to the respective one of connections 121A-C. Additionally, connection 141, corresponding to participant 151 (Dave), is also identified within the participant list 311 by showing the respective participant name (Dave).

During the videoconference 130, the captured audio 104 and/or captured video 103 of the device-sharing participants 111A-C may be analyzed to determine when one of the device-sharing participants 111A-C is an active talker. Referring back to FIG. 2, it is shown that analysis components 105 may use video analysis 201 and/or audio analysis 202 to perform active talker detection 212, which detects when one of the device-sharing participants 111A-C is an active talker. A variety of techniques may be employed to perform active talker detection 212. For example, in some cases, the voiceprinting techniques described above may be employed, such as to detect when the voice characteristics of an active talker match one of the voiceprints 221A-C for the device-sharing participants 111A-C. Other techniques, such as lip movement detection, facial detection, facial recognition, a microphone audio directionality analysis, and others, may also be employed. For example, a combination of lip movement detection and facial recognition could be employed to detect an active talker, such as by first detecting a person whose lips are moving (e.g., via lip movement detection) and then using facial recognition to recognize that person's face.

In some examples, one or more video and/or audio processing operations may be performed when it is detected that one of the device-sharing participants 111A-C is an active talker. For example, in some cases, a visual indication of the active talker may be provided within the videoconference display 300, such as a highlighting of the video stream of the active talker. For example, as shown in FIG. 3, video stream 122B, corresponding to Bob, is highlighted in videoconference display 300, as shown by the thick bold outlining of video stream 122B in FIG. 3. This indicates that Bob may be speaking during the time that videoconference display 300 of FIG. 3 is displayed. In some examples, upon determining that Bob is an active talker, the analysis components 105 may provide a message to a conferencing service that hosts the videoconference 130 to indicate that Bob is the active talker and should be highlighted in the videoconference display 300.

Figure 4:
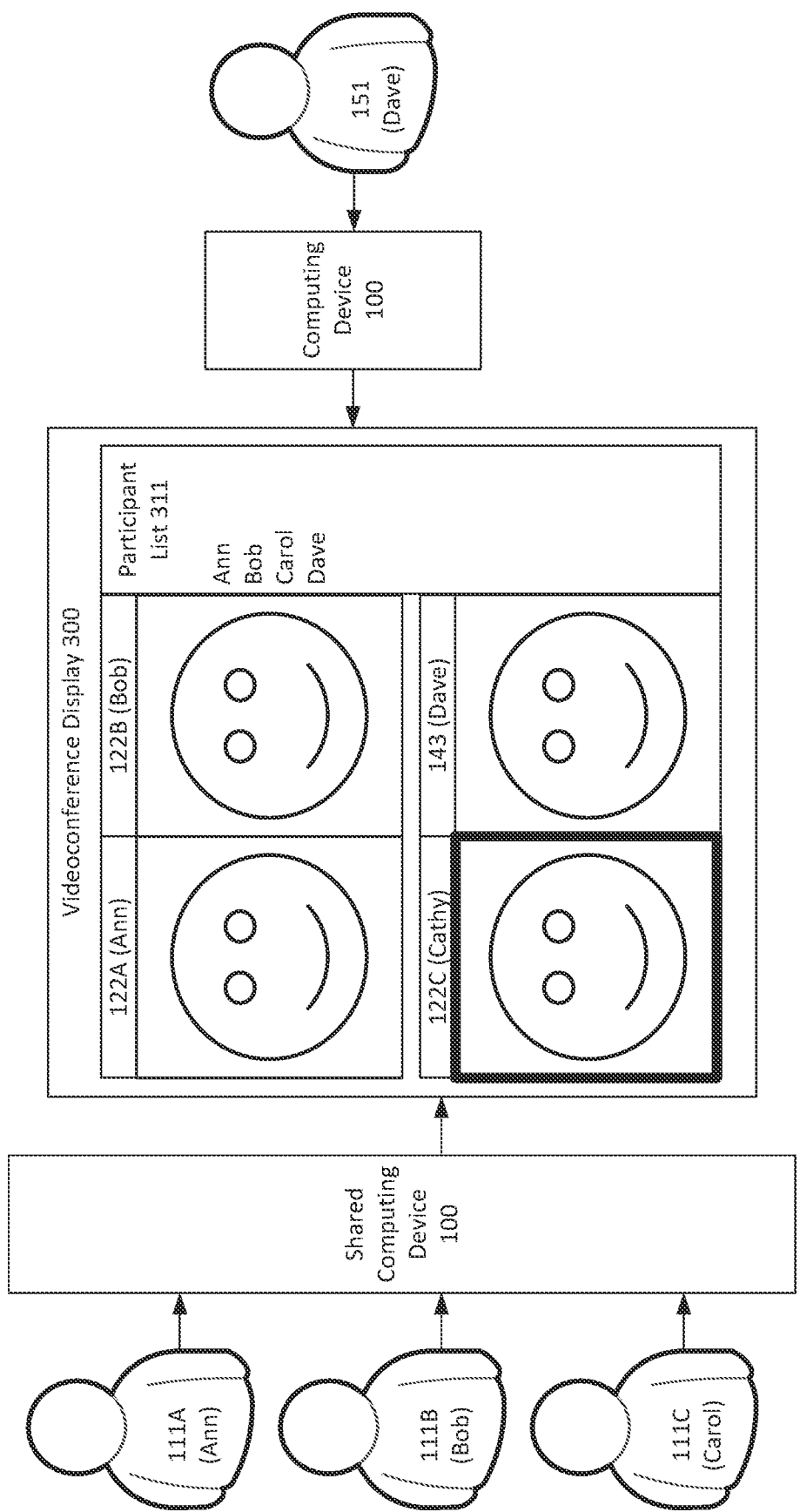
FIG. 4 is a diagram illustrating an example videoconference display with a second active talker that may be used in accordance with the present disclosure.

As should be appreciated, the identity of the active talker may change several times during the course of the videoconference 130. For example, referring now to FIG. 4, an example is shown in which analysis components 105 determine that the active talker has changed from Bob to Carol. As shown in FIG. 4, video stream 122C, corresponding to Carol, is highlighted in videoconference display 300, as shown by the thick bold outlining of video stream 122C in FIG. 4. This indicates that Carol may be speaking during the time that videoconference display 300 of FIG. 4 is displayed. In some examples, upon determining that Carol is the active talker, the analysis components 105 may provide a message to a conferencing service that hosts the videoconference 130 to indicate that Carol is the active talker and should be highlighted in the videoconference display 300.

As another example, in some cases, audio may be temporarily routed to the videoconference 130 on behalf of the respective audio stream for that device-sharing participant during the time that he, or she, is the active talker. For example, in some cases, during the time that Bob is speaking, the captured audio 104 may be temporarily routed to the videoconference 130 via video stream 122B corresponding to Bob. Then, when Carol begins to speak, the captured audio 104 may be temporarily routed to the videoconference 130 via video stream 122C corresponding to Carol.

Figure 5:
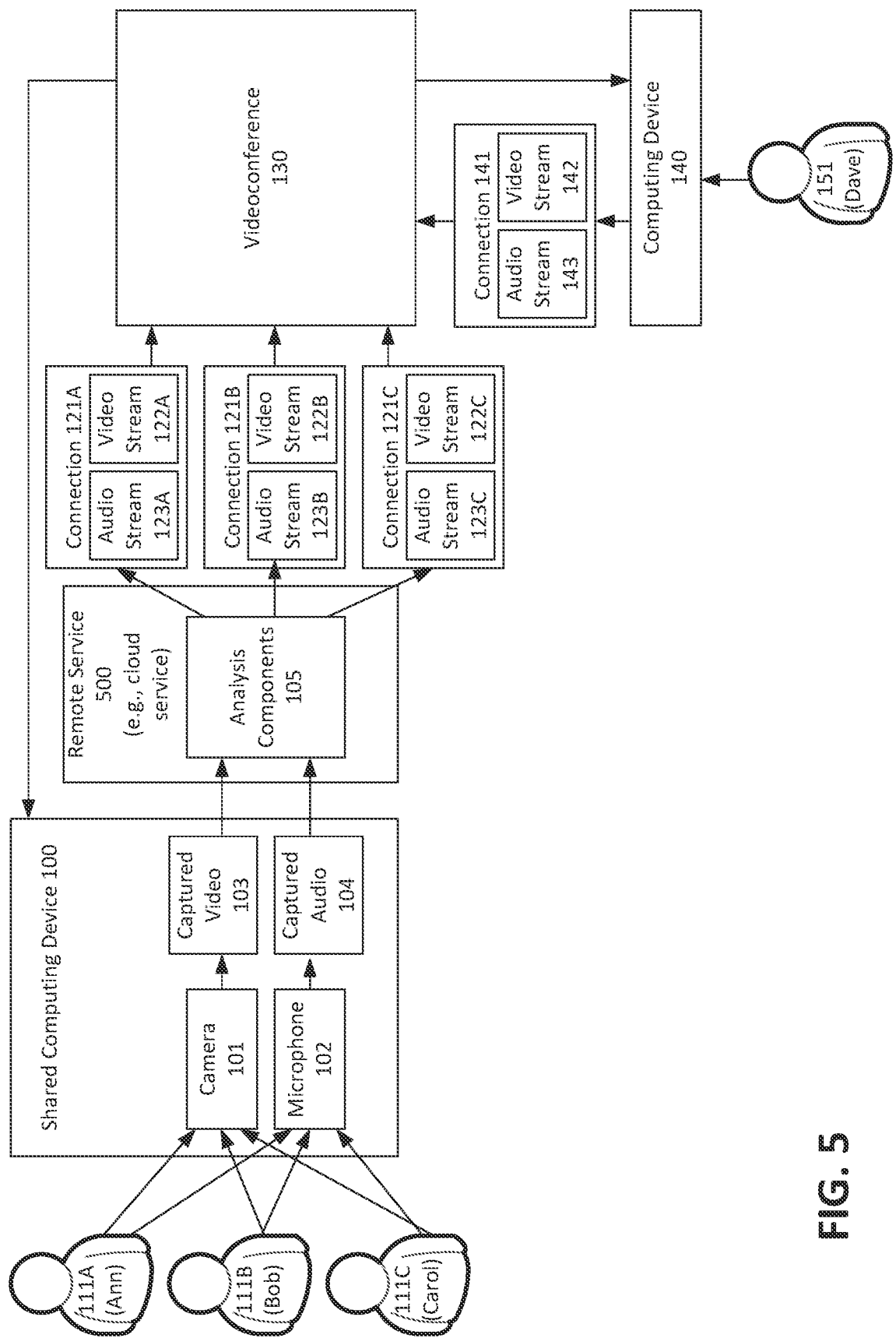
FIG. 5 is a diagram illustrating an example participant representation system with remote service-based analysis that may be used in accordance with the present disclosure.

FIG. 1 depicts an example in which analysis components 105 are included in the shared computing device 100. However, in some other examples, the analysis components 105 may be executed wholly, or partially, external to the shared computing device 100. Referring now to FIG. 5, an example is shown in which analysis components 105 are executed at a remote service 500, such as a cloud service or other server-based service. In some examples, the remote service 500 may be included in, or may be otherwise associated with, a conferencing service that hosts the videoconference 130. In some cases, execution of the analysis components 105 at remote service 500 may be advantageous, such as because the remote service 500 may offer more computing resources (e.g., processing resources, memory resources, etc.) than may be available at the shared computing device 100. In some examples, the analysis components 105 may be distributed between the shared computing device 100, the remote service 500, and optionally any number of other devices or services.

Figure 6:
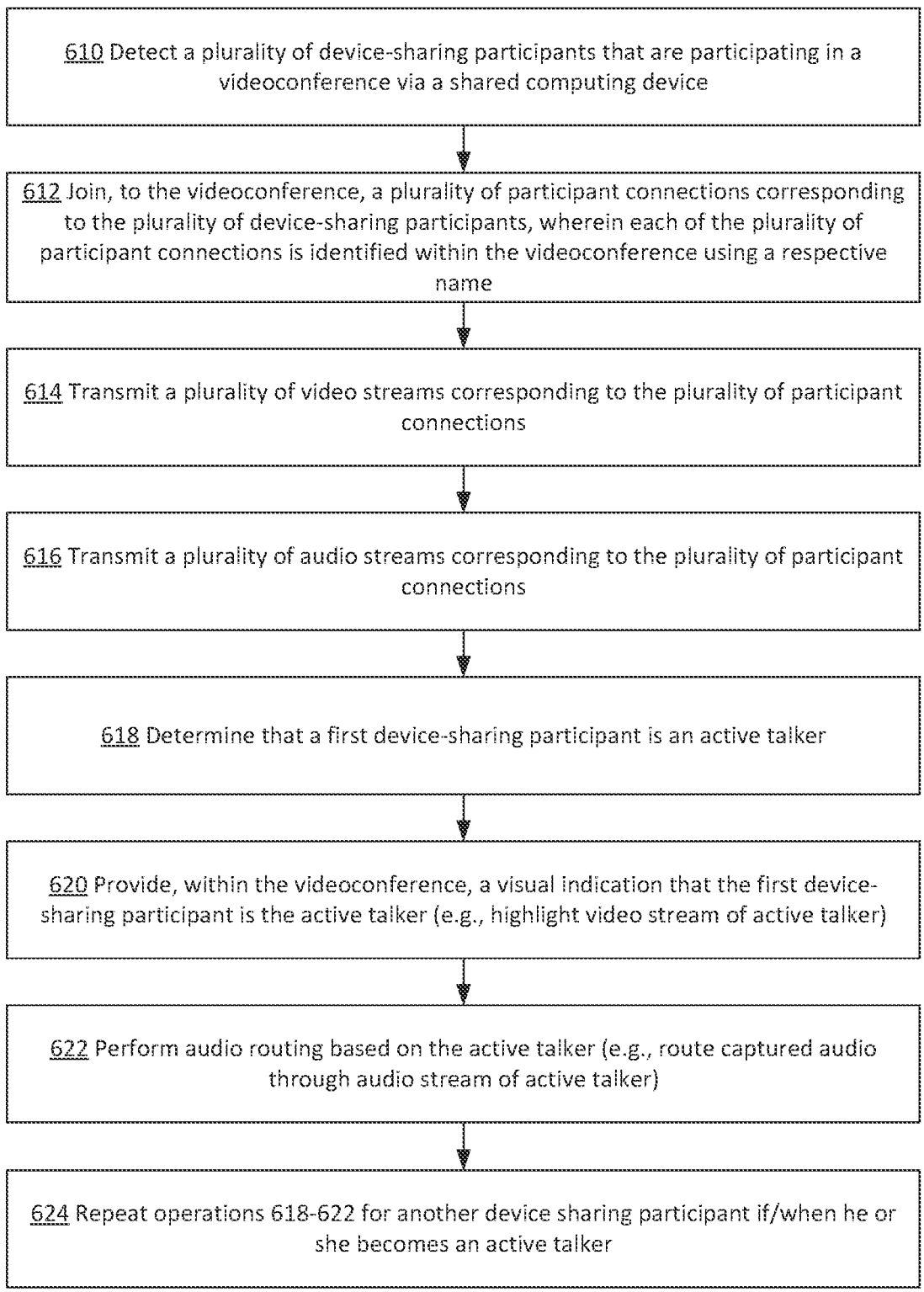
FIG. 6 is a flowchart illustrating an example participant representation process that may be used in accordance with the present disclosure.

FIG. 6 is a flowchart illustrating an example participant representation process that may be used in accordance with the present disclosure. In some examples, any, or all, of operations 610-624 of FIG. 6 may be performed by analysis components 105 and may be performed locally, for example at the shared computing device 100, and/or remotely, for example at remote service 500. At operation 610, a plurality of device-sharing participants are detected that are participating in a videoconference via a shared computing device. For example, as described above with reference to FIG. 1, device-sharing participants 111A-C participate in the videoconference 130 via a shared computing device 100. At least one other participant may also participate in the videoconference via at least one other computing device. For example, as shown in FIG. 1, participant 151 participates in videoconference 130 via computing device 140. The shared computing device 100 may be for example, a room conferencing device, a laptop, smartphone, or another computing device. The device-sharing participants 111A-C may be at the same, or similar, location as one another, such as within the same room, or otherwise grouped around the shared computing device 100. For example, in some cases, the shared computing device 100 may be a personal device, such as a laptop, and the device-sharing participants 111A-C may be huddled around the personal device. Also, in some examples, the shared computing device 100 may be a room conferencing device, and the device-sharing participants 111A-C may participate in the videoconference 130 via the room conferencing device.

The detecting of the plurality of device-sharing participants may be performed based, at least in part, on a video analysis of captured video from one or more cameras connected to the shared computing device. The one or more connected cameras may include internal cameras that are in the shared computing device itself and/or external cameras that are otherwise connected to the shared computing device. The video analysis may include, for example, at least one of a facial detection analysis, a facial recognition analysis, or a lip movement detection analysis. The detecting of the plurality of device-sharing participants may also be performed based, at least in part, on an audio analysis of captured audio from one or more microphones connected to the shared computing device. The one or more connected microphones may include internal microphones that are in the shared computing device itself and/or external microphones that are otherwise connected to the shared computing device. The audio analysis may include, for example, at least one of a voiceprinting analysis or a speech recognition analysis As described above, the analysis components 105 may receive the captured video 103 from one or more cameras (e.g., including camera 101) connected to the shared computing device 100. The analysis components 105 may also receive the captured audio 104 from one or more microphones (e.g., including microphone 102) connected to the shared computing device 100. The analysis components 105 may analyze the captured video 103 and/or the captured audio 104 to detect that the plurality of device-sharing participants 111A-C are participating in the videoconference via the shared computing device 100. A variety of techniques may be employed to detect the device-sharing participants 111A-C. As shown in FIG. 2, the analysis components 105 may receive captured video 103 and captured audio 104. The analysis components 105 may perform a video analysis 201 on the captured video 103 and may perform an audio analysis 202 on the captured audio 104. The video analysis 201 may include techniques such as facial detection, facial recognition, lip movement detection, and others. The audio analysis 202 may include techniques such as voiceprinting, speech recognition, and others. In some examples, any, or all, of these, and other, analysis techniques may be performed based, at least in part, on one or more machine learning models, such as one or more neural networks. Thus, the detecting of the plurality of device-sharing participants may be performed based, at least in part, on at least one machine learning analysis of at least one of the captured audio or the captured video. Specifically, the audio analysis may include a machine learning analysis of the captured audio, and the video analysis may include a machine learning analysis of the captured video.

As shown in FIG. 2, the analysis components 105 may employ video analysis 201 and/or audio analysis 202 to perform device-sharing participant detection 211, which detects the device-sharing participants 111A-C. In some examples, each person detected by analysis components 105, based on captured video 103 and/or captured audio 104, may be considered to be one of the device-sharing participants 111A-C. The analysis components 105 may detect the device-sharing participants 111A-C at the initiation of the videoconference 130. The analysis components 105 may also detect when one or more of the device-sharing participants 111A-C exit the videoconference 130 while it is in-progress. In some examples, one of the device-sharing participants 111A-C may exit the videoconference 130 by leaving a room, or otherwise moving away from a location of the shared computing device 100 while the videoconference 130 is in-progress. The analysis components 105 may also detect when one or more additional device-sharing participants (not shown in FIG. 1) join the videoconference 130 while it is in-progress. In some examples, an additional device-sharing participant may join the videoconference 130 by entering a room, or otherwise moving to a location of the shared computing device 100 while the videoconference 130 is in-progress. In some examples, the analysis components 105 may determine, and track, a total device-sharing participant quantity, for example including determining the total device-sharing participant quantity at the initiation of the videoconference 130 and tracking changes to the total device-sharing participant quantity while the videoconference 130 is in-progress, such as to account for people that join and exit the videoconference 130 while the videoconference 130 is in-progress.

In some examples, analysis components 105 may perform a facial detection and/or facial recognition analysis on the captured video 103 to detect and/or recognize faces of people in the captured video 103. In some examples, each detected and/or recognized face may be determined to be one of the device-sharing participants 103A-C. As another example, analysis components 105 may analyze the captured audio 104 to detect the device-sharing participants 111A-C. In one specific example, each device-sharing participant 111A-C may identify herself or himself via a designated spoken phrase, such as the words "hello I am" followed by the person's name. These spoken words may then be detected via a speech recognition analysis on the captured audio 104.

As another specific example, the captured audio 104 may be analyzed to determine unique speakers, such as via voiceprinting techniques. In the example of FIG. 2, voiceprints 221A-N are generated for device-sharing participants 111A-C. Specifically, voiceprint 221A is generated for device-sharing participant 111A (Alice), voiceprint 221B is generated for device-sharing participant 111B (Bob), and voiceprint 221C is generated for device-sharing participant 111C (Carol). Voiceprinting may also be used to detect device-sharing participants 111A-C. For example, when a first person (e.g., Ann) speaks, the captured audio 104 may be analyzed to determine a first voiceprint (e.g., voiceprint 221A) that indicates first audio characteristics of the speech of the first person (e.g., Ann). When a second person (e.g., Bob) speaks, the captured audio 104 may be analyzed, and it may be determined that the second person's speech does not match the first voiceprint (e.g., voiceprint 221A) of the first person (e.g., Ann). A second voiceprint (e.g., voiceprint 221B) may then be generated that indicates second audio characteristics of the speech of the second person (e.g., Bob). Each new detected speaker that does not match an already generated voiceprint may be determined to be one of the device-sharing participants 111A-C. Furthermore, in some examples, motion detection, such as lip movement detection, may be employed, such as to assist in matching detected voices in the captured audio 104 to detected faces in the captured video 103.

At operation 612, a plurality of participant connections (e.g., connections 121A-C of FIGS. 1 and 5) corresponding to the plurality of device-sharing participants are joined to the videoconference. For example, a respective connection may be joined to the videoconference for each of the device-sharing participants. In some examples, if N is the quantity of device-sharing participants that are sharing the same shared computing device, then the videoconference may be joined N times, once for each of the device-sharing participants. For example, in some cases, if it is determined that three device-sharing participants are sharing the same shared computing device, then three separate connections, corresponding to the three device-sharing participants, may be joined to the videoconference. Referring back to FIG. 1, it is shown that, upon detection of the device-sharing participants 111A-C, three connections 121A-C, corresponding to the device-sharing participants 111A-C, respectively, are joined to the videoconference 130, such as by analysis components 105. In this example, each device-sharing participant 111A-C has his, or her, own respective connection 121A-N. Specifically, connection 121A corresponds to device-sharing participant 111A (Ann), connection 121B corresponds to device-sharing participant 111B (Bob), and connection 121C corresponds to device-sharing participant 111C (Carol). Each of connections 121A-C has a respective one of video streams 122A-C and a respective one of audio streams 123A-C.

Each of the plurality of participant connections may be identified within the videoconference using a respective name, such as a respective name of a respective one of the plurality of device-sharing participants to which the participant connection corresponds. For example, as described above with reference to FIG. 3, each of the connections 121A-C may be identified in a participant list 311 that is included in the videoconference display 300. In this example, each of connections 121A-C corresponds to a respective one of the device-sharing participants 111A-C. Thus, each of connections 121A-C is identified in the participant list 311 by showing the name of the respective one of the device-sharing participants 111A-C (e.g., Alice, Bob and Carol). In some examples, each of device-sharing participants 111A-C may be prompted to provide his or her name (e.g., by speaking his or her name at a designated time, after a designated phrase, etc.), or the name may be other- wise determined or detected, and this name may then be assigned to the respective one of connections 121A-C. Additionally, connection 141, corresponding to participant 151 (Dave), is also identified within the participant list 311 by showing the respective participant name (Dave).

At operation 614, a plurality of video streams corresponding to the plurality of participant connections are transmitted. For example, the plurality of video streams may be transmitted from analysis components 105 to a conferencing service that hosts the videoconference 130 and then, in turn, from the conferencing service to each connected conferencing device that is used by conference participants to connect to the videoconference. As described above, each connection 121A-C has a respective video stream 122A-C. The plurality of video streams may be presented (e.g., displayed) to the at least one other participant on the at least one other computing device. For example, the video streams 122A-C may be output, as part of the videoconference 130, to participant 151 (Dave) and/or device-sharing participants 111A-C. Each video stream of the plurality of video streams may include video of a respective device-sharing participant of the plurality of device-sharing participants, which may be the device-sharing participant corresponding to the participant connection to which the video stream corresponds. In some cases, each video stream of the plurality of video streams may include a respective part of the captured video corresponding to a respective device-sharing participant of the plurality of device-sharing participants, which may be the device-sharing participant corresponding to the participant connection to which the video stream corresponds. For example, during the videoconference 130, the video streams 122A-C may each show video of a respective one of device-sharing participants 111A-C. In some examples, if the captured video 103 from camera 101 shows faces of all of the device-sharing participants 111A-C, then video streams 122A-C may be formed based on the captured video 103 with each of video stream 122A-C including a respective cropped portion of the captured video 103 that shows a face of a respective one of the device-sharing participants 111A-C. In some other examples, multiple cameras may be used, for example with each camera capturing video of a given one, or a given subgroup, of the device-sharing participants 111A-C.

In some examples, the plurality of video streams may be displayed simultaneously with one another. As described above with reference to FIG. 3, videoconference display 300 shows video stream 122A, from connection 121A, corresponding to device-sharing participant 111A (Ann); video stream 122B, from connection 121B, corresponding to device-sharing participant 111B (Bob); video stream 122C, from connection 121C, corresponding to device-sharing participant 111C (Carol); and video stream 142, from connection 141, corresponding to participant 151 (Dave). As shown in FIG. 3, video stream 122A shows video of Ann, including Ann's face, which is centered in the video stream 122A. Video stream 122B shows video of Bob, including Bob's face, which is centered in the video stream 122B. Video stream 122C shows video of Carol, including Carol's face, which is centered in the video stream 122C. Video stream 142 shows video of Dave, including Dave's face, which is centered in the video stream 142.

At operation 616, a plurality of audio streams corresponding to the plurality of participant connections are transmitted. For example, the plurality of audio streams may be transmitted from analysis components 105 to a conferencing service that hosts the videoconference 130 and then, in turn, from the conferencing service to each connected conferencing device that is used by conference participants to connect to the videoconference. As described above, each connection 121A-C has a respective audio stream 123A-C. The plurality of audio streams may be presented (e.g., played) to the at least one other participant on the at least one other computing device. For example, the audio streams 123A-C may be output, as part of the videoconference 130, to participant 151 (Dave) and/or device-sharing participants 111A-C. Each audio stream of the plurality of audio streams may include audio of a respective device-sharing participant of the plurality of device-sharing participants, which may be the device-sharing participant corresponding to the participant connection to which the audio stream corresponds. In some cases, each audio stream of the plurality of audio streams may include a respective part of the captured audio corresponding to a respective device-sharing participant of the plurality of device-sharing participants, which may be the device-sharing participant corresponding to the participant connection to which the audio stream corresponds. For example, audio stream 123A may include audio of device-sharing participant 111A (Ann), audio stream 123B may include audio of device-sharing participant 111B (Bob) and audio stream 123C may include audio of device-sharing participant 111C (Carol). As described above, to make this happen, the captured audio may be temporarily routed to a corresponding audio stream whenever it is detected that a respective device sharing participant is an active talker. For example, when it is detected that Bob is speaking, the captured audio 104 may be routed to audio stream 123B, corresponding to Bob, for transmission to the videoconference 130.

At operation 618, it is determined that a first device-sharing participant of the plurality of device-sharing participants is an active talker. As described above, during the videoconference 130, the captured audio 104 and/or captured video 103 of the device-sharing participants 111A-C may be analyzed to determine when one of the device-sharing participants 111A-C is an active talker. Referring back to FIG. 2, it is shown that analysis components 105 may use video analysis 201 and/or audio analysis 202 to perform active talker detection 212, which detects when one of the device-sharing participants 111A-C is an active talker. A variety of techniques may be employed to perform active talker detection 212. For example, in some cases, a plurality of voiceprints may be determined each corresponding to a respective one of the plurality of device-sharing participants. As shown in FIG. 2, voiceprints 221A-C are determined for the device-sharing participants 111A-C. The first device-sharing participant may then be determined to be the active talker based, at least in part, on voice characteristics of the active talker matching a first voiceprint of the plurality of voiceprints that corresponds to the first device-sharing participant. Other techniques, such as lip movement detection, facial detection, facial recognition, a microphone audio directionality analysis, and others, may also be employed. For example, a combination of lip movement detection and facial recognition could be employed to detect an active talker, such as by first detecting a person whose lips are moving (e.g., via lip movement detection) and then using facial recognition to recognize that person's face.

At operation 620, a visual indication is provided, within the videoconference, that indicates that the first device-sharing participant is the active talker. In some examples, the visual indication may include highlighting of the video stream of the first device-sharing participant. For example, as shown in FIG. 3, video stream 122B, corresponding to Bob, is highlighted in videoconference display 300, as shown by the thick bold outlining of video stream 122B in FIG. 3. This indicates that Bob may be speaking during the time that videoconference display 300 of FIG. 3 is displayed. In some examples, upon determining that Bob is an active talker, the analysis components 105 may provide a message to a conferencing service that hosts the videoconference 130 to indicate that Bob is the active talker and should be highlighted in the videoconference display 300.

At operation 622, audio routing is performed based on the active talker. For example, audio may be routed, to the videoconference, via a first audio stream corresponding to the first device-sharing participant based on the determining that the first device-sharing participant is the active talker. As described above, in some cases, audio may be temporarily routed to the videoconference 130 on behalf of the respective audio stream for a device-sharing participant during the time that he, or she, is the active talker. For example, in some cases, during the time that Bob is speaking, the captured audio 104 may be temporarily routed to the videoconference 130 via video stream 122B corresponding to Bob.

At operation 624, operations 618-622 may be repeated for another device-sharing participant if, and when, he or she becomes a next active talker. As should be appreciated, the identity of the active talker may change several times during the course of the videoconference 130. As described above, FIG. 4, shows an example in which analysis components 105 determine that the active talker has changed from Bob to Carol. As shown in FIG. 4, video stream 122C, corresponding to Carol, is highlighted in videoconference display 300, as shown by the thick bold outlining of video stream 122C in FIG. 4. This indicates that Carol may be speaking during the time that videoconference display 300 of FIG. 4 is displayed. Additionally, when Carol begins to speak, the captured audio 104 may be temporarily routed to the videoconference 130 via video stream 122C corresponding to Carol. It is noted that other non-sharing conference participants, such as participant 151 of FIG. 1 (Dave), which do not share their device with other participants, may also become active talkers during the videoconference 130. The system may include analysis components that detect when these non-sharing participants become active talkers and may perform responsive operations, such as highlighting their video streams. Additionally, in some examples, two or more conference participants may speak simultaneously, and there may be two or more simultaneous active talkers. The analysis components may also detect when there are multiple simultaneous active talkers and may also perform responsive operations, such as simultaneous highlighting of their respective video streams.

Figure 7:
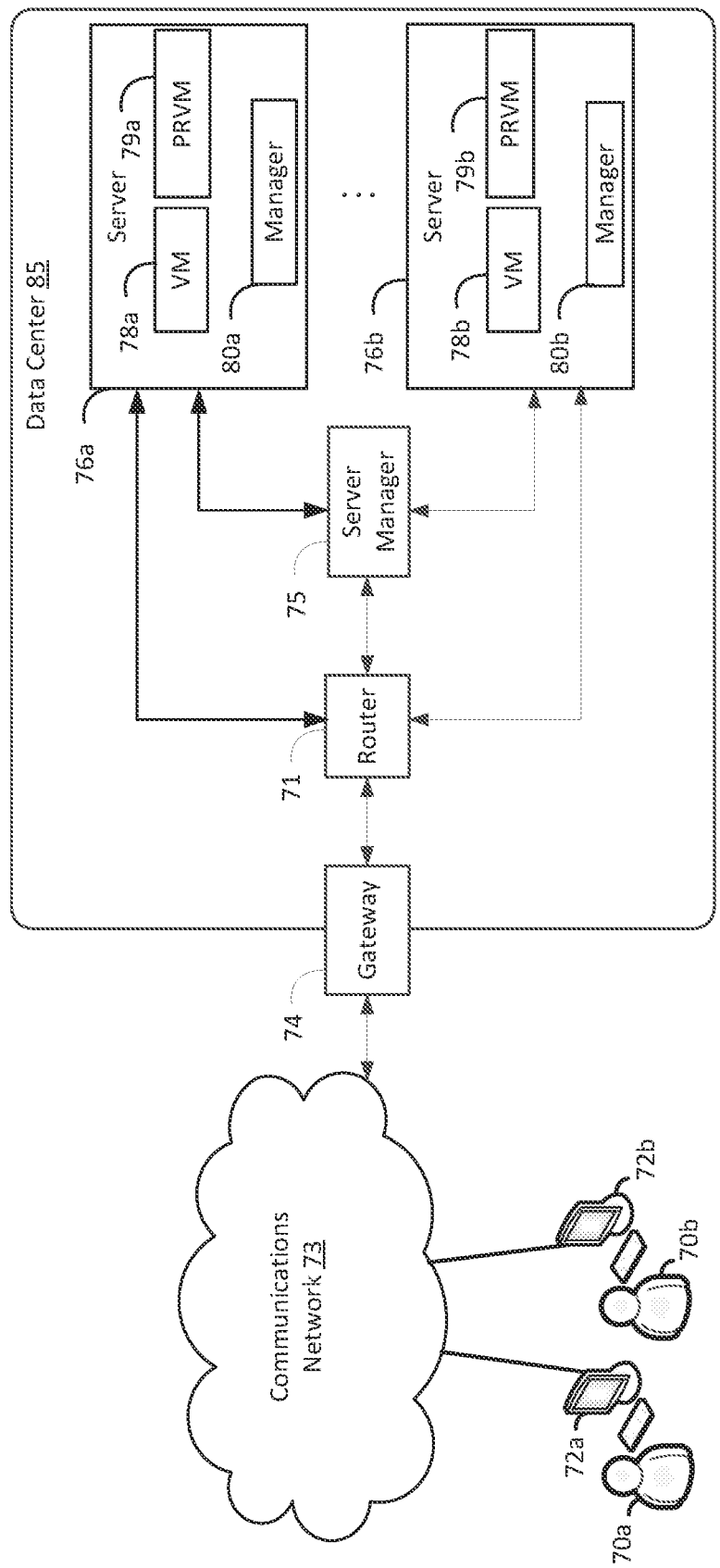
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also participant representation virtual machines (PRVM's) 79a-b, which are virtual machines that are configured to execute any, or all, of the techniques for separately representing device-sharing videoconference participants described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
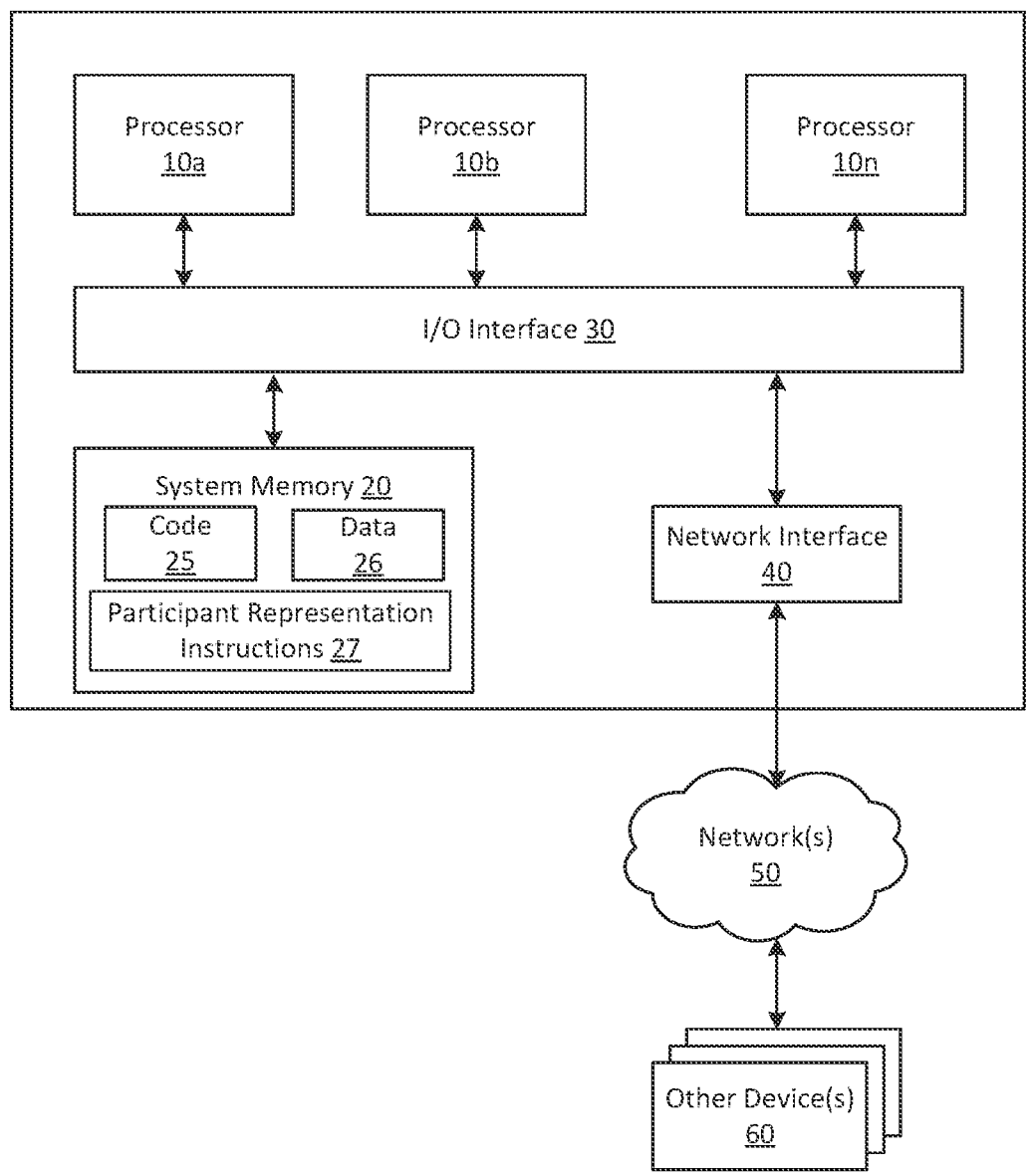
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes participant representation instructions 27, which are instructions for executing any, or all, of the techniques for separately representing device-sharing videoconference participants described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
    one or more processors; and
    one or more memories having stored therein instructions that, upon execution by the one or more processors, cause the computing system to perform computing operations comprising:
        detecting a plurality of device-sharing participants that are participating in a videoconference via a shared computing device, wherein the detecting of the plurality of device-sharing participants is performed based, at least in part, on at least one of an audio analysis of captured audio from one or more microphones connected to the shared computing device or a video analysis of captured video from one or more cameras connected to the shared computing device, and wherein at least one other participant also participates in the videoconference via at least one other computing device;
        joining, to the videoconference, a plurality of participant connections corresponding to the plurality of device-sharing participants, wherein each of the plurality of participant connections is identified within the videoconference using a respective name of a respective device-sharing participant of the plurality of device-sharing participants;
        transmitting a plurality of video streams corresponding to the plurality of participant connections, wherein each video stream of the plurality of video streams includes a respective part of the captured video corresponding to the respective device-sharing participant; and
        transmitting a plurality of audio streams corresponding to the plurality of participant connections, wherein each audio stream of the plurality of audio streams includes a respective part of the captured audio corresponding to the respective device-sharing participant, and wherein the plurality of video streams and the plurality of audio streams are presented to the at least one other participant.

2. The computing system of claim 1, wherein the audio analysis comprises at least one of a voiceprinting analysis or a speech recognition analysis.

3. The computing system of claim 1, wherein the video analysis comprises at least one of a facial detection analysis, a facial recognition analysis, or a lip movement detection analysis.

4. The computing system of claim 1, wherein the operations further comprise:
 determining that a first device-sharing participant of the plurality of device-sharing participants is an active talker; and
 routing the captured audio via a first audio stream of the plurality of audio streams corresponding to the first device-sharing participant based on the determining that the first device-sharing participant is the active talker.

5. The computing system of claim 1, wherein the detecting of the plurality of device-sharing participants is performed based, at least in part, on at least one machine learning analysis of at least one of the captured audio or the captured video.

6. A computer-implemented method comprising:
 detecting a plurality of device-sharing participants that are participating in a videoconference via a shared computing device, wherein at least one other participant also participates in the videoconference via at least one other computing device;
 joining, to the videoconference, a plurality of participant connections corresponding to the plurality of device-sharing participants, wherein each of the plurality of participant connections is identified within the videoconference using a respective name;
 transmitting a plurality of video streams corresponding to the plurality of participant connections; and
 transmitting a plurality of audio streams corresponding to the plurality of participant connections, wherein the plurality of video streams and the plurality of audio streams are presented to the at least one other participant.

7. The computer-implemented method of claim 6, wherein each video stream of the plurality of video streams includes video of a respective device-sharing participant of the plurality of device-sharing participants.

8. The computer-implemented method of claim 6, wherein the detecting of the plurality of device-sharing participants is performed based, at least in part, on an audio analysis of captured audio from one or more microphones connected to the shared computing device.

9. The computer-implemented method of claim 8, wherein the audio analysis comprises at least one of a voiceprinting analysis or a speech recognition analysis.

10. The computer-implemented method of claim 6, wherein the detecting of the plurality of device-sharing participants is performed based, at least in part, on a video analysis of captured video from one or more cameras connected to the shared computing device.

11. The computer-implemented method of claim 10, wherein the video analysis comprises at least one of a facial detection analysis, a facial recognition analysis, or a lip movement detection analysis.

12. The computer-implemented method of claim 6, further comprising:
 determining that a first device-sharing participant of the plurality of device-sharing participants is an active talker.

13. The computer-implemented method of claim 12, further comprising:
 determining a plurality of voiceprints each corresponding to a respective one of the plurality of device-sharing participants.

14. The computer-implemented method of claim 13, wherein first device-sharing participant is determined to be the active talker based, at least in part, on voice characteristics of the active talker matching a first voiceprint of the plurality of voiceprints that corresponds to the first device-sharing participant.

15. The computer-implemented method of claim 12, further comprising:
 routing audio via a first audio stream of the plurality of audio streams corresponding to the first device-sharing participant based on the determining that the first device-sharing participant is the active talker.

16. One or more non-transitory computer-readable storage media having stored thereon computing instructions that, upon execution by one or more compute nodes, cause the one or more compute nodes to perform computing operations comprising:
 detecting a plurality of device-sharing participants that are participating in a videoconference via a shared computing device, wherein at least one other participant also participates in the videoconference via at least one other computing device;
 joining, to the videoconference, a plurality of participant connections corresponding to the plurality of device-sharing participants, wherein each of the plurality of participant connections is identified within the videoconference using a respective name; and
 transmitting a plurality of video streams corresponding to the plurality of participant connections; and
 transmitting a plurality of audio streams corresponding to the plurality of participant connections, wherein the plurality of video streams and the plurality of audio streams are presented to the at least one other participant.

17. The one or more non-transitory computer-readable storage media of claim 16, wherein the detecting of the plurality of device-sharing participants is performed based, at least in part, on at least one of an audio analysis of captured audio from one or more microphones connected to the shared computing device or a video analysis of captured video from one or more cameras connected to the shared computing device.

18. The one or more non-transitory computer-readable storage media of claim 16, wherein the operations further comprise:
 determining that a first device-sharing participant of the plurality of device-sharing participants is an active talker.

19. The one or more non-transitory computer-readable storage media of claim 18, wherein the operations further comprise:
 providing, within the videoconference, a visual indication that indicates that the first device-sharing participant is the active talker.

20. The one or more non-transitory computer-readable storage media of claim 18, wherein the operations further comprise:
 routing audio via a first audio stream of the plurality of audio streams corresponding to the first device-sharing participant based on the determining that the first device-sharing participant is the active talker.

* * * * *